Patented Apr. 29, 1930

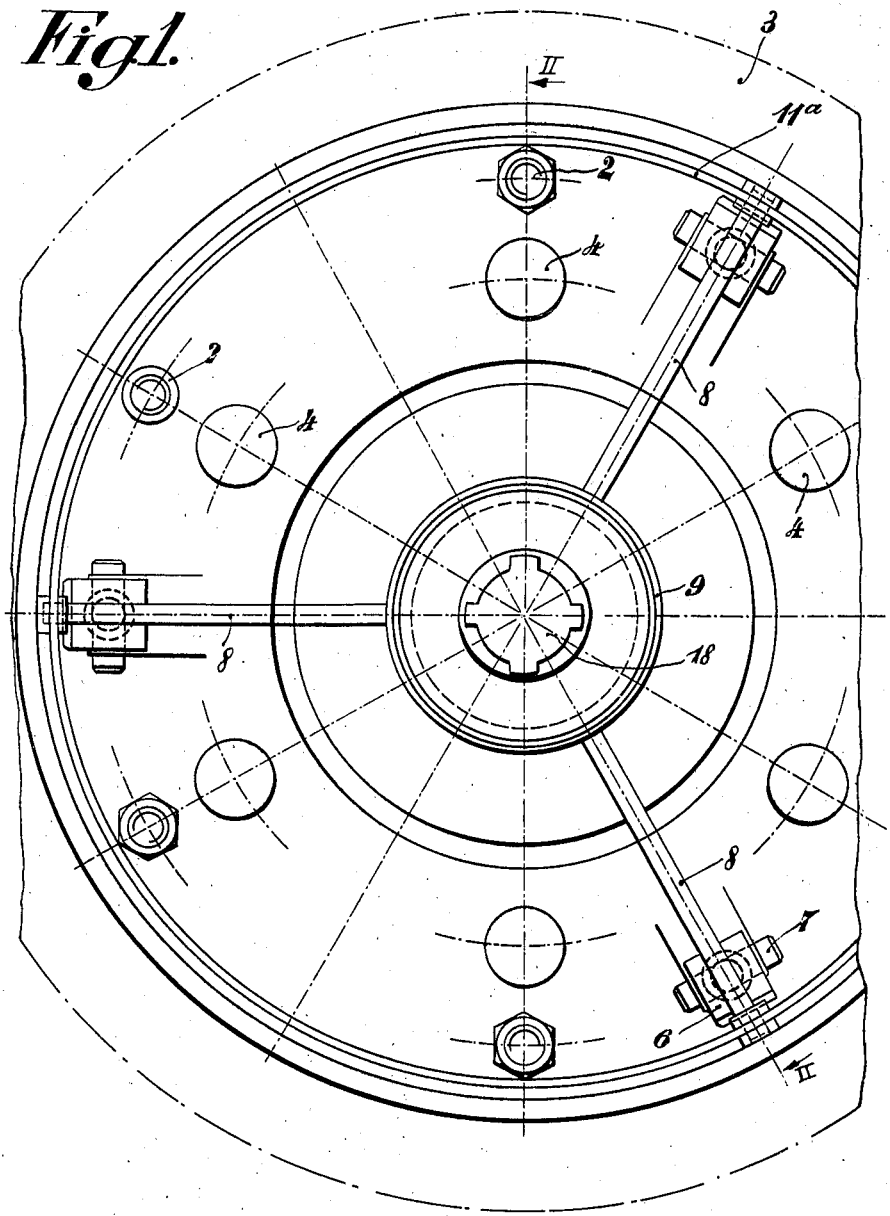

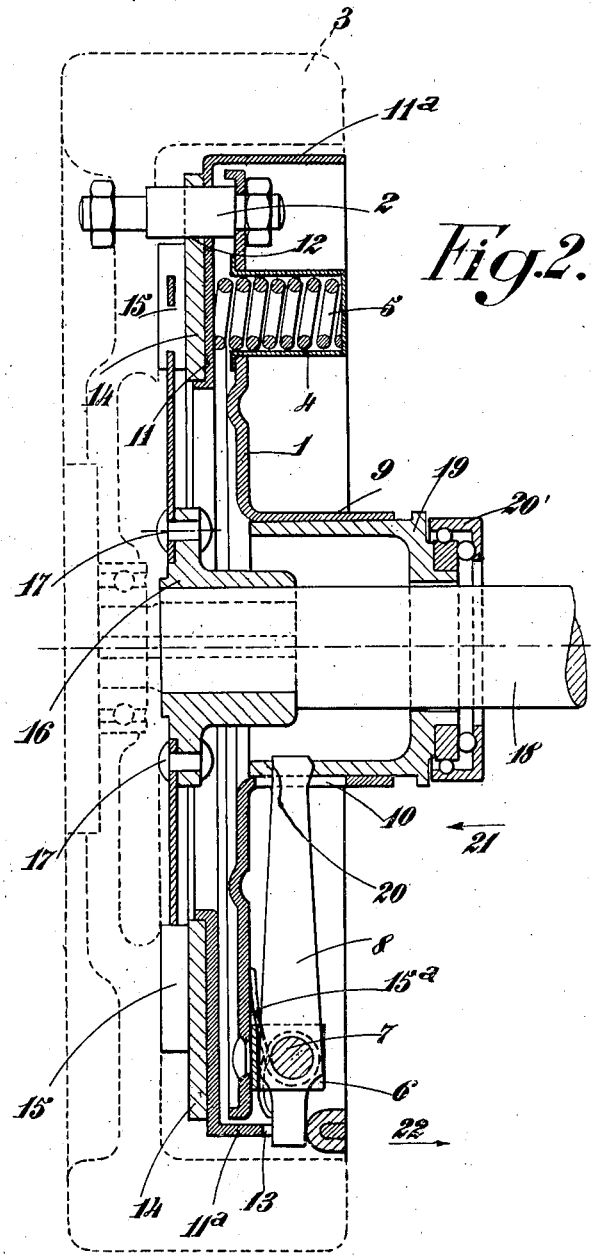

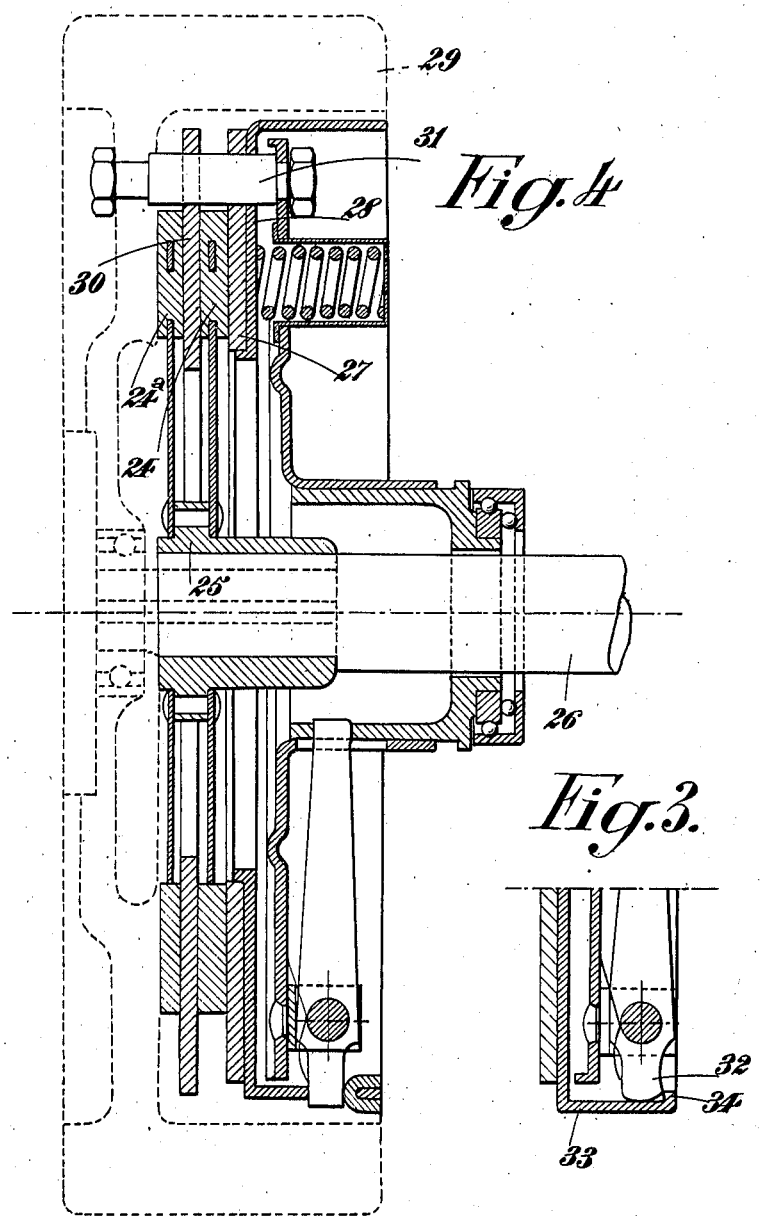

1,756,731

UNITED STATES PATENT OFFICE

EDOUARD JEAN DESROZIERS, OF PARIS, FRANCE

DISK FRICTION CLUTCH

Application filed March 9, 1928, Serial No. 260,483, and in France March 23, 1927.

The present invention relates to improvements in disk friction clutches, which improvements are intended to reduce the manufacturing cost of such clutches to a minimum whilst at the same time providing clutches which can be mounted on or taken off the clutch shaft as a single unit without it being necessary to dismantle intermediary members, and to provide a smooth drive during operation.

The invention relates more particularly to friction clutches of the type comprising a fixed plate, that is to say a plate prevented from sliding on the clutch shaft, a friction disk clamped between a compression plate and the fly wheel or other rotated members, and radial controlling levers pivotally mounted on the fixed plate at a point intermediate their two ends, the outer ends of said levers, the inner ends of which are controlled by a member sliding on the clutch shaft, acting on the compression plate through the medium of a device (studs or the like) provided with a spring, and this invention is essentially characterized by the fact that the compression plate has a peripheral lip or rim surrounding the fixed plate, said lip being provided with means with which the outer ends of the control levers engage directly.

According to a form of embodiment of the invention, the above specified means are constituted either by openings let into the lip of the compression plate, or by the end of the lip which is curved inwards over the whole periphery of the latter.

According to a form of embodiment of the invention, the control levers are located without the fixed plate and pivot about axes carried by the outer face of the fixed plate.

On the face of the compression plate, facing the fly-wheel, a ring, having a certain thickness and capable of bearing directly against the friction plate, may be provided for the purpose of rapidly getting rid of the heat generated by friction.

The fixed plate may be provided with several series of openings, some intended to take the driving studs, others for receiving pressed cups in which are housed compression springs whose line of action extends between the base of said cup and the compression plate.

Other advantages and peculiarities of the invention will become apparent from the description about to be given thereof in conjunction with the accompanying drawings in which:

Fig. 1 is an elevation of a clutch with a single friction disk improved in accordance with the invention.

Fig. 2 is a sectional view on II—II Fig. 1.

Fig. 3 is a fragmentary sectional view showing an alternative form of actuation of the compression plate by the control levers.

Fig. 4 is a view similar to that of Fig. 2 but illustrating a multiple disk clutch.

Reference being had to the drawings, and more particularly to Figs. 1 and 2, the clutch illustrated comprises a fixed plate 1, that is to say a plate which cannot shift longitudinally on the clutch shaft, and in which several series of openings are provided, some intended to receive driving studs 2 secured to a fly-wheel or other rotated member 3, and others for housing cups 4 in which the compression springs 5 are lodged. As illustrated, the plate 1, is provided, furthermore, with openings in which are fixed fork joints 6 carrying pins 7 on which control levers 8 can pivot.

The plate 1 which is preferably stamped out, has a hub 9 in which are made recesses 10 into which the inner ends of the levers 8 can project.

The compression plate 11 is mounted between the fixed plate 1 and the fly-wheel 3, openings 12 being let into said plate to take driving studs 2. Said compression plate 11 is subjected to the action of the compression springs 5 lodged in the cups 4, as indicated above. The compression plate 11 has a peripheral rim or lip 11ª forming a dish, the inner diameter of which is greater than the outer diameter of the fixed plate 1. The lip 11ª is provided with means with which the outer ends of the levers 8 can engage, said means being constituted in the example illustrated by openings 13.

A ring 14 bearing directly against the friction disk 15 is fixed to the face of the compression plate 11 situated opposite the flywheel 3, by any suitable means, i. e. either by electric or oxy-acetylene welding, or by expanding, or by any other process.

In the example illustrated in Fig. 2, only a single flat friction disk 15 is employed, but obviously several friction disks might be utilized, as in the case of Fig. 4, and these disks might have any other suitable form. The friction disk 15, Fig. 2, is mounted on a hub 16 by means of rivets 17 to rotate therewith, said hub 16 being mounted on the clutch shaft 18.

The clutch is actuated through the medium of a controlling sleeve 19 which can slide within the hub 9 of the plate 1 and has notches 20 made in it, against the bottom of which the inner ends of the levers 8 press. A collar or special form of bearing 20' which takes the thrust consequent on declutching, is carried by the end of the sleeve 19.

The clutch operates as follows:

On exerting force on the sleeve 19, so as to make it slide within the hub 9 in the direction of the arrow 21, the sleeve 19 acts on the inner ends of the levers 8 and causes these latter to pivot about the axes 7. As a result, the outer ends of the levers 8 shift the compression plate 11 in the direction of the arrow 22 against the action of the compression springs 5. In this manner, the friction disk 15 is freed and no longer bears against the flywheel 3, so that declutching ensues.

On the contrary, when the thrust on the bearings 20' is removed, the compression springs 5 come into action and, through the medium of the compression plate 11, press against the friction disk 15 and the clutch is again let in, said movement being facilitated by the springs 15ª acting between the pins 7 and the fixed plate 1.

In the case of Fig. 4, where it has been assumed that the clutch comprises several friction disks, the general arrangement of the fixed plate, the compression plate and the control levers remains unchanged. On the hub 25, to which the clutch shaft 26 is secured, are mounted the disks 24 and 24ª, to rotate with said hub. As in the previous case, the disk 24 bears directly against the ring 27 secured to the compression plate 28. However, said disk 24, instead of contacting directly with the fly-wheel 29, acts on a plate 30 intermediate the disks 24 and 24ª and through which pass the driving studs 31. Thus, the disk 24ª acts between the intermediate plate 30 and the fly-wheel 29.

By way of alternative (Fig. 3), the end of the small lever arm 32, instead of protruding into an opening let into the edge of the compression plate 33, acts on a peripheral lip 34 of said compression plate 33.

This arrangement of the levers 8 enables the clutch to be removed or assembled as a single unit. For, due to their sliding in the recesses 10 of the hub 9 of the plate 1 and in the recesses 13 of the compression plate 11, the levers become wedged under the action of the springs 5 which tend to push back the compression plate.

From the preceding description it will be observed that the majority of the chief parts are constructed on simple lines either by stamping or embossing operation, whereby the manufacturing cost can be reduced to a minimum. Furthermore, owing to the special form of the clutch, the friction disk's driving studs are very short whereby any chattering of the clutch on its being let in is eliminated. Finally, in view of the form and special dimension of the compression plate with respect to the fixed plate, the maximum leverage can be obtained with the control levers. These latter may pivot about axes located in places generally reserved for the clutch's fixing bolts.

It is self-evident that the invention has only been described and illustrated in a purely explanatory but by no means limitative manner, and that it could be subjected to various modifications of detail without departing from the spirit thereof.

I claim:

1. In a friction clutch, the combination of a plate fixedly connected to one of the clutch parts and rotating therewith, a friction disk arranged in spaced relation to said fixed plate, a compression plate located intermediate said friction disk and said fixed plate, a peripheral lip to said compression plate surrounding said fixed plate, a plurality of members pivotally connected to said fixed plate on the opposite side thereof to said compression plate, means for oscillating said members relative to said fixed plate, and means associated with the lip of said compression plate with which said members engage directly for displacing said compression plate relative to said friction disk.

2. In a friction clutch, the combination of a plate fixedly connected to one of the clutch parts and rotating therewith, a friction disk arranged in spaced relation to said fixed plate, a compression plate located intermediate said friction disk and said fixed plate, a peripheral lip to said compression plate surrounding said fixed plate, a plurality of levers pivotally connected to said fixed plate intermediate their ends and on the opposite side thereof to said compression plate, means for oscillating said levers relative to said fixed plate, and means provided on the lip of said compression plate with which the outer ends of said levers, projecting beyond said fixed plate are adapted to engage directly for displacing said compression plate relative to said friction disk.

3. In a friction clutch, the combination of a plate fixedly connected to one of the clutch parts and rotating therewith, a friction disk arranged in spaced relation to said fixed plate, a compression plate located intermediate said friction disk and said fixed plate, a peripheral lip to said compression plate surrounding said fixed plate, a plurality of levers pivotally connected to said fixed plate intermediate their ends and on the opposite side thereof to said compression plate, and means for oscillating said levers relative to said fixed plate, the outer ends of said levers, which project beyond said fixed plate, being adapted to engage in openings provided in said lip whereby said compression plate is displaced relative to said friction disk through the oscillation of said levers.

4. In a friction clutch, the combination of a clutch shaft, a plate apertured to receive said clutch shaft and fixedly connected to one of the clutch parts to rotate therewith, a friction disk mounted on said clutch shaft in spaced relation to said fixed plate, a compression plate located intermediate said friction disk and said fixed plate, a peripheral lip to said compression plate surrounding said fixed plate, a plurality of levers pivotally connected to said fixed plate intermediate their ends and on the opposite side of said fixed plate to said compression plate, a sleeve mounted to slide on said clutch shaft and including notches in which the inner ends of said levers engage, the outer ends of said levers being adapted to engage in openings in said compression plate lip, and a central flange to said fixed plate mounted on said sleeve and having a plurality of recesses through which said levers project, said clutch being adapted to be removed as a whole by the wedging of said levers in said flange recesses and compression plate lip openings.

5. In a friction clutch, the combination of a plate fixedly connected to one of the clutch parts and rotating therewith, a friction disk arranged in spaced relation to said fixed plate, a compression plate located intermediate said friction disk and said fixed plate, a peripheral lip to said compression plate surrounding said fixed plate, a ring secured to said compression plate for contacting with said friction disk and getting rid of the heat of friction, a plurality of members pivotally connected to said fixed plate on the opposite side thereof to said compression plate, means for oscillating said members relative to said fixed plate, and means associated with the lip of said compression plate with which said members engage directly for displacing said compression plate relative to said friction disk.

EDOUARD JEAN DESROZIERS.